US009458000B2

(12) United States Patent
Richard et al.

(10) Patent No.: US 9,458,000 B2
(45) Date of Patent: Oct. 4, 2016

(54) PALLET TRUCK ADAPTER

(71) Applicants: Andrew P. Richard, Gladwin, MI (US); John C. Belotti, Bay City, MI (US)

(72) Inventors: Andrew P. Richard, Gladwin, MI (US); John C. Belotti, Bay City, MI (US)

(73) Assignee: Magline, Inc., Standish, MI (US)

(*) Notice: Subject to any disclaimer, the term of this patent is extended or adjusted under 35 U.S.C. 154(b) by 0 days.

(21) Appl. No.: 14/679,082

(22) Filed: Apr. 6, 2015

(65) Prior Publication Data

US 2015/0217979 A1   Aug. 6, 2015

Related U.S. Application Data

(62) Division of application No. 13/365,743, filed on Feb. 3, 2012, now abandoned.

(51) Int. Cl.
*B66F 9/12* (2006.01)
*B62B 3/06* (2006.01)

(52) U.S. Cl.
CPC . *B66F 9/12* (2013.01); *B62B 3/06* (2013.01); *B62B 2203/20* (2013.01)

(58) Field of Classification Search
CPC ....................................................... B66F 9/12
See application file for complete search history.

(56) References Cited

U.S. PATENT DOCUMENTS

| 2,827,189 | A | 3/1958 | Knudstrup |
| 3,176,866 | A | 4/1965 | Meister |
| 3,258,146 | A | 6/1966 | Hamilton |
| 3,310,189 | A | 3/1967 | Vander Wal |
| 3,737,060 | A | 6/1973 | Shaffer |
| 4,149,644 | A | 4/1979 | Fuller |
| 5,692,583 | A | 12/1997 | Reed |
| 6,015,255 | A | 1/2000 | Vander Meer |
| 7,744,335 | B1 | 6/2010 | Cleary |
| 7,856,932 | B2 | 12/2010 | Stahl |
| 7,987,797 | B2 | 8/2011 | Stahl |
| 7,988,405 | B2 | 8/2011 | Ellington |
| 8,011,677 | B1 | 9/2011 | Ellington |
| 2009/0183953 | A1 | 7/2009 | Ellington |
| 2009/0185890 | A1 | 7/2009 | Ellington |
| 2011/0091305 | A1 | 4/2011 | Preesman |
| 2011/0170999 | A1 | 7/2011 | Hailston |
| 2011/0171000 | A1 | 7/2011 | Hailston |

*Primary Examiner* — Jonathan Snelting
(74) *Attorney, Agent, or Firm* — Varnum, Riddering, Schmidt & Howlett LLP (57) ABSTRACT

A pallet truck adapter having side by side shoes for fitting over pallet supporting tines, in which the shoes are of different heights. This facilitates locating one pallet on the higher shoe, lifting it slightly off of the supporting surface, and then moving to and lifting another pallet on the lower shoe. The adjacent pallets can then be moved together and off loaded at different locations, unloading the pallet on the lower shoe first, and the pallet on the higher shoe thereafter.

1 Claim, 7 Drawing Sheets

PALLET TRUCK ADAPTER

CROSS-REFERENCE TO RELATED APPLICATIONS

This application is a divisional application of U.S. application Ser. No. 13/365,743 filed Feb. 3, 2012.

STATEMENT REGARDING FEDERALLY SPONSORED RESEARCH OR DEVELOPMENT

Not Applicable.

REFERENCE TO SEQUENCE LISTING, A TABLE OR COMPUTER PROGRAM LISTING, COMPACT DISK APPENDIX

Not Applicable.

BACKGROUND OF THE INVENTION

1. Field of the Invention

The present invention relates to pallet truck adapters and, more particularly, to a method for moving pallets from place to place on a pallet truck.

2. Background Art

Pallet truck adapters are typically mounted on the tines of a fork lift truck, walkie rider or pallet jack, in order to more specifically adapt the truck to particular uses. The term "pallet truck" as used herein refers to any mobile device designed to carry pallets on tines which can be inserted beneath the pallet and raised to lift the pallet for carrying and lowered to place the pallet at a desired location. Thus, "pallet truck" encompasses a fork lift truck, a so called walkie rider, a pallet jack, or like device. Such trucks typically have a pair of tines, though sometimes more, which are inserted under a pallet. However, the term "tine" is intended to include a single pallet lifting platform, or several tines, serving the same lifting, carrying and lowering function of the more typical pair of tines. Likewise, the tines of a walkie rider or pallet jack are often thicker than those of a fork lift truck, and often include floor engaging wheels located in the tines, which are associated with a lifting mechanism located in the tines, such that as the tines are elevated, the wheels continue to make contact with the floor.

SUMMARY OF THE INVENTION

In accordance with the invention, a method is provided for moving pallets from place to place on a pallet truck. The pallets are sufficiently small in width so that two can be moved on a set of pallet truck tines. The method includes providing a pallet truck adapter having at least a pair of shoes for fitting over pallet supporting tines. The shoes have bottoms, tops, and sides. The shoe bottoms are both in approximately the same plane, and the shoes are of differing heights. The method in accordance with the invention comprises manipulating the pallet truck so as to locate the taller shoe beneath a first pallet resting on the floor. The pallet adapter is then lifted slightly off of the supporting surface by raising the pallet truck tines. The first pallet is then moved, and the lower shoe of the adapter is located beneath a second pallet resting on the floor. The adapter is further raised to also lift the second pallet off the floor. Both the first and second pallets are thus moved about, and are deposited in the same location, or alternatively, in separate locations, by lowering the adapter such that the second pallet makes contact with the supporting floor first, and then the first pallet makes contact with the supporting surface.

These and other objects, advantages and features of the present invention will be more fully understood and appreciated by reference to the specification and appended drawings.

DESCRIPTION OF THE PREFERRED EMBODIMENTS

In the preferred embodiment, pallet truck adapter 1 comprises a right shoe 10a and a left shoe 10b for fitting over the tines of a pallet truck, joined by a backstop plate 2 and a bottom brace 3. (FIGS. 1-3) Backstop plate includes spaced openings 2a one of which is aligned with the interior of right shoe 10a and the other of which is aligned with the interior of left shoe 10b. This allows the tines of a fork lift truck to be inserted into shoes 10a and 10b, so that adapter 1 can be raised and lowered with the tines of the fork lift truck.

Figure 1:
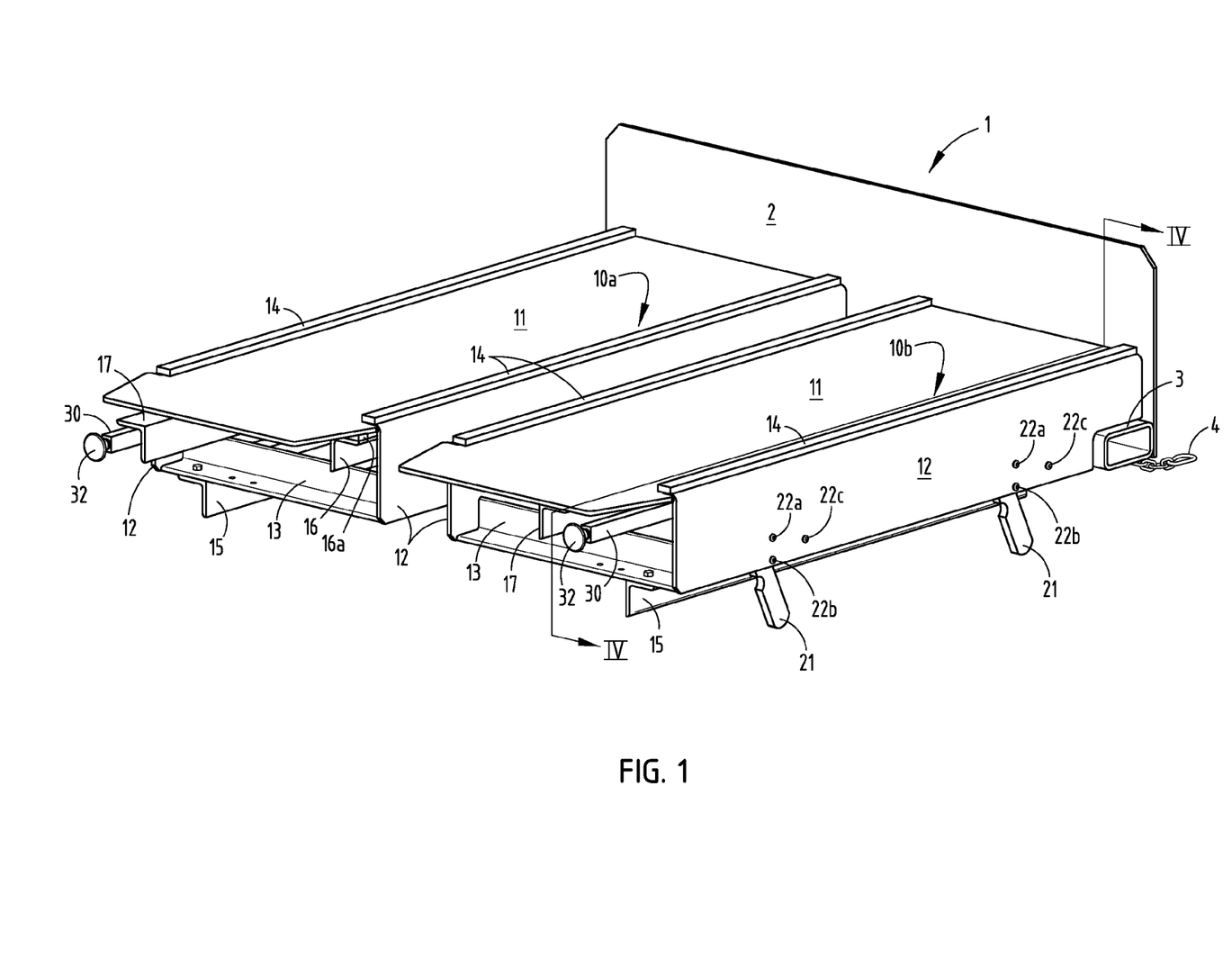
FIG. 1 is a slightly elevated perspective view of the pallet truck adapter of the preferred embodiment.
Figure 3:
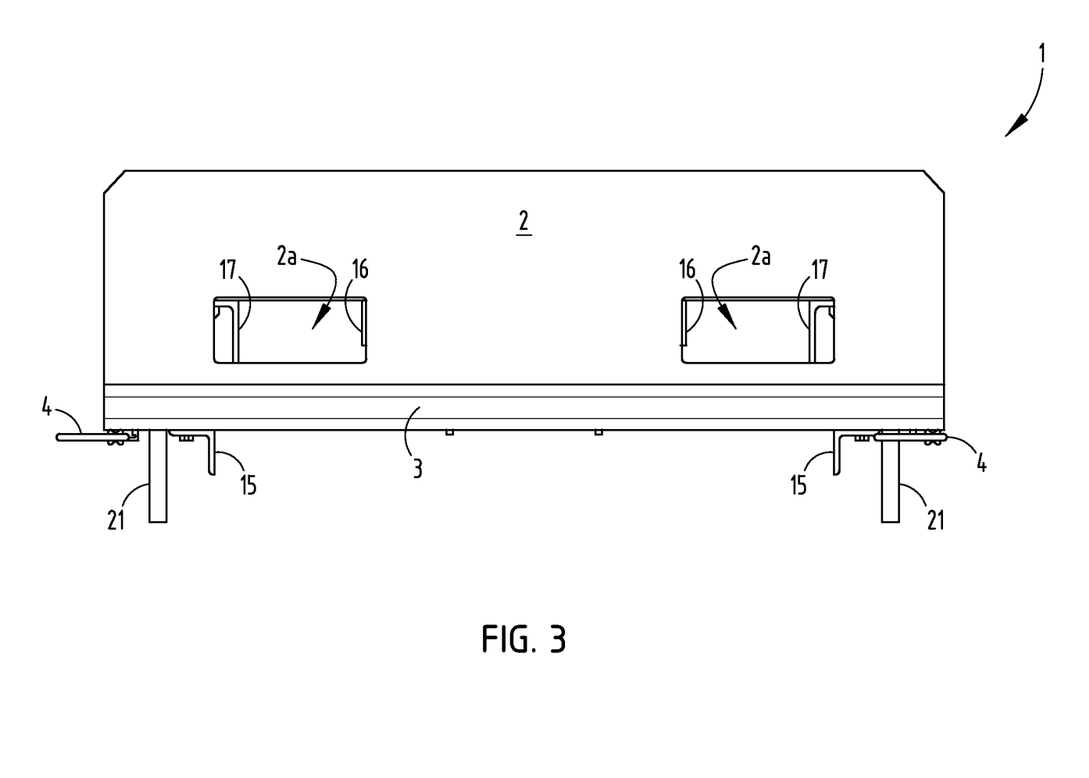
FIG. 3 is a rear elevation of the adapter
Figure 4:
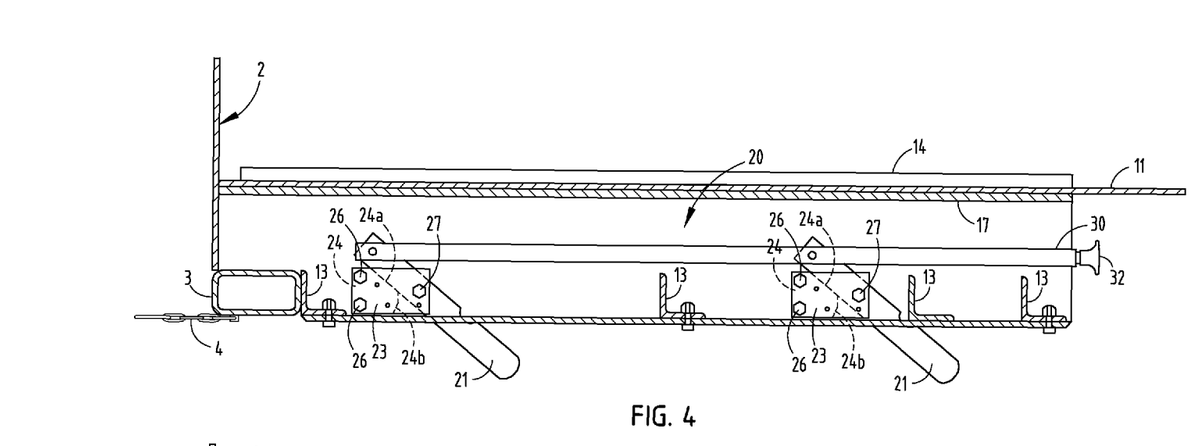
FIG. 4 is a cross sectional view of the adapter taken along plane IV-IV of FIG. 1, with the support legs in their elevated position.
Figure 5:
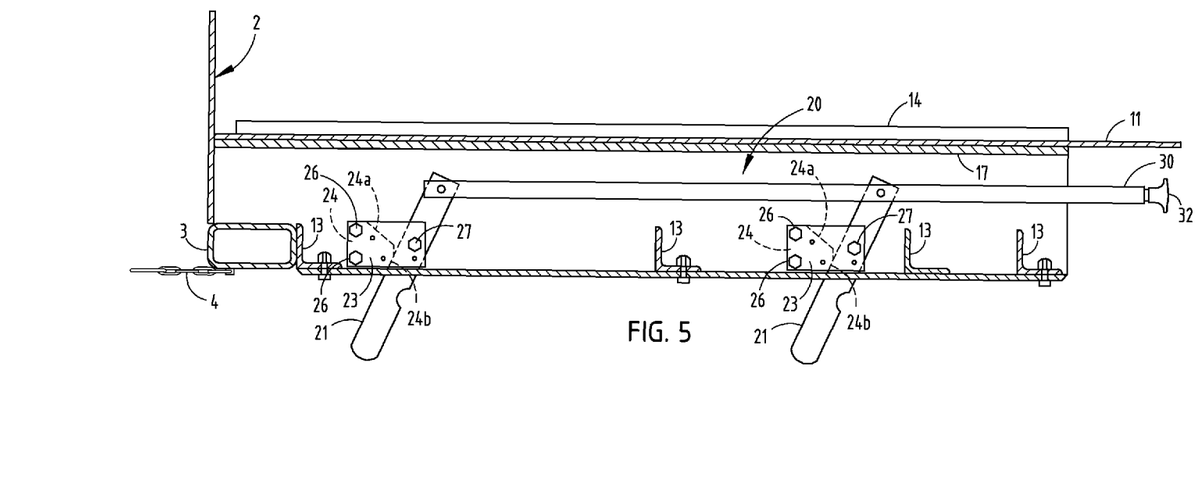
FIG. 5 is the same cross sectional view with the legs in their lowered position.
Figure 6:
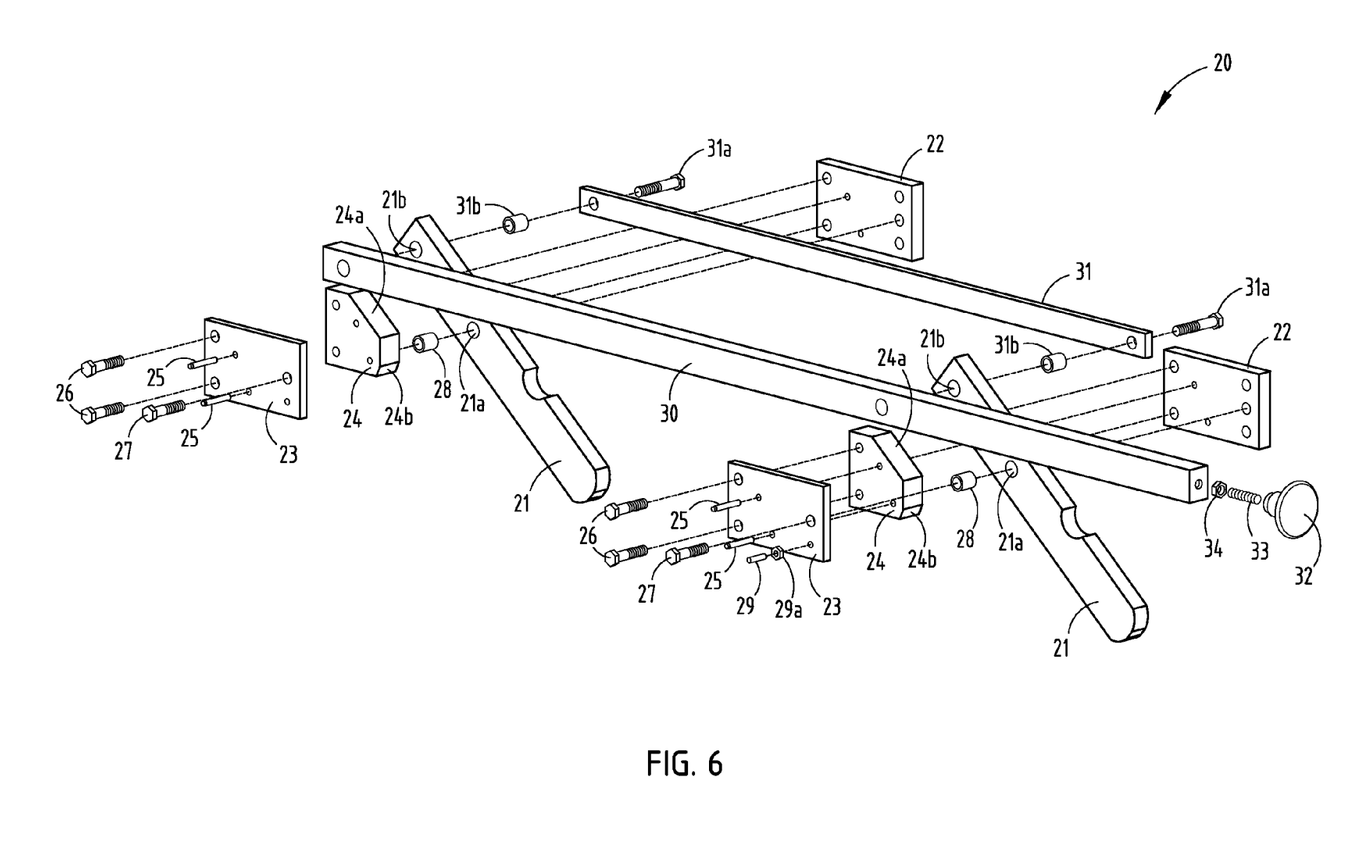
FIG. 6 is an exploded view of the leg assembly, showing the leg in its elevated position.

Each shoe 10a-b includes a retractable leg assembly 20. Legs 21 of each assembly can be retracted as shown in FIGS. 4 and 6, or lowered as shown in FIGS. 1, 3 and 5, by pulling or pushing, respectively, an actuator rod 30. Legs 21 are sufficiently long that, when lowered, they leave a gap between the bottom of shoes 10a and 10b and the floor on which adapter 1 is resting. This gap is tall enough that the tines of a walkie rider, pallet jack or like device having tines with floor engaging wheels can slide underneath adapter 1, to facilitate adapter 1 being raised and lowered with the walkie rider tines.

Once the tines of a fork lift or walkie rider are inserted fully into or beneath, respectively, shoes 10a and 10b, chain and quick-disconnect clip 4 can be used to secure adapter 1 to the fork lift truck or walkie rider. Preferably clip 4 is a carabiner clip. If the legs 21 had been in their lowered position, they can be raised.

Preferably, each shoe 10a and 10b is sufficiently wide to stably support a half size pallet, with legs depending downwardly on opposite sides of the shoe. The shoes are sufficiently short from top to bottom that the legs of the pallet extend below the bottom of the shoes. Thus, a forklift truck or walkie rider with adapter 1 attached can be driven into position with the one or both of the shoes of adapter 1 passing beneath a pallet or pair of side by side pallets, each shoe passing between the legs of a pallet. When the tines are raised, adapter 1 and pallets supported thereon are raised accordingly. When the tines are lowered, adapter 1 is lowered, and the pallet legs come to rest on the floor at the location desired for their placement. The walkie rider or forklift truck can then be operated in reverse, so that shoes 10a and 10b slide out from under the pallet or pallets.

The sidewalls of right shoe 10a are taller than the sidewalls 12 of left shoe 10b. Shoes 10a and 10b are arranged with their bottoms aligned. In this way, right shoe 10a can be used to pick up or drop off a pallet in a different location than left shoe 10b. Thus for pickup, right shoe 10a can be slid into position below a first pallet, raised slightly to lift the first pallet off of the floor, and the truck or walkie rider moved to a different location for picking up another pallet using left shoe 10b. Because it is shorter in height, left shoe 10b can be slid under a second pallet while the first pallet is held slightly elevated off of the floor. The tines of the forklift truck or walkie rider can then be elevated still farther until both the first and second pallets are lifted off of the floor. The pallets can then be moved to a different location and the tines, and accordingly shoes 10a and 10b, lowered sufficiently that the pallet being carried by the shorter shoe 10b engages the floor. Shoe 10b can be slid out from beneath the pallet which is now supported by the floor, leaving it in place. The truck or walkie rider is then moved to a different location where its tines are lowered still farther so that the first pallet supported by the taller shoe 10a engages the floor. Shoe 10a can then be removed from beneath the pallet so lowered to the floor. If adapter 1 is no longer needed on the times, it can be driven to a storage location, legs 21 rotated downwardly into their erected position by pulling on actuator rod 30, and adapter 1 lowered to the floor by lowering the tines. Once it is resting on the floor, the forklift or walkie rider can be operated in reverse to remove the tines from within or from beneath adapter 1, respectively.

Adapter 1 is preferably made of steel or other rugged material. Each shoe 10a and 10b is box-like in configuration, having a top wall 11, downwardly depending sidewalls 12 and a generally open bottom. Bottom braces 13 which are "L" shaped in cross section extend across the open bottom of each shoe 10a and 10b, between the opposite sidewalls 12. Two cross braces 13 are located towards the front of each shoe. A third cross brace 13 is positioned generally midway between the front of the shoe and its junction with back plate 2. The fourth brace 13 is positioned adjacent backstop plate 2, and the vertical leg of the fourth brace is secured to backstop plate 2.

Figure 2:
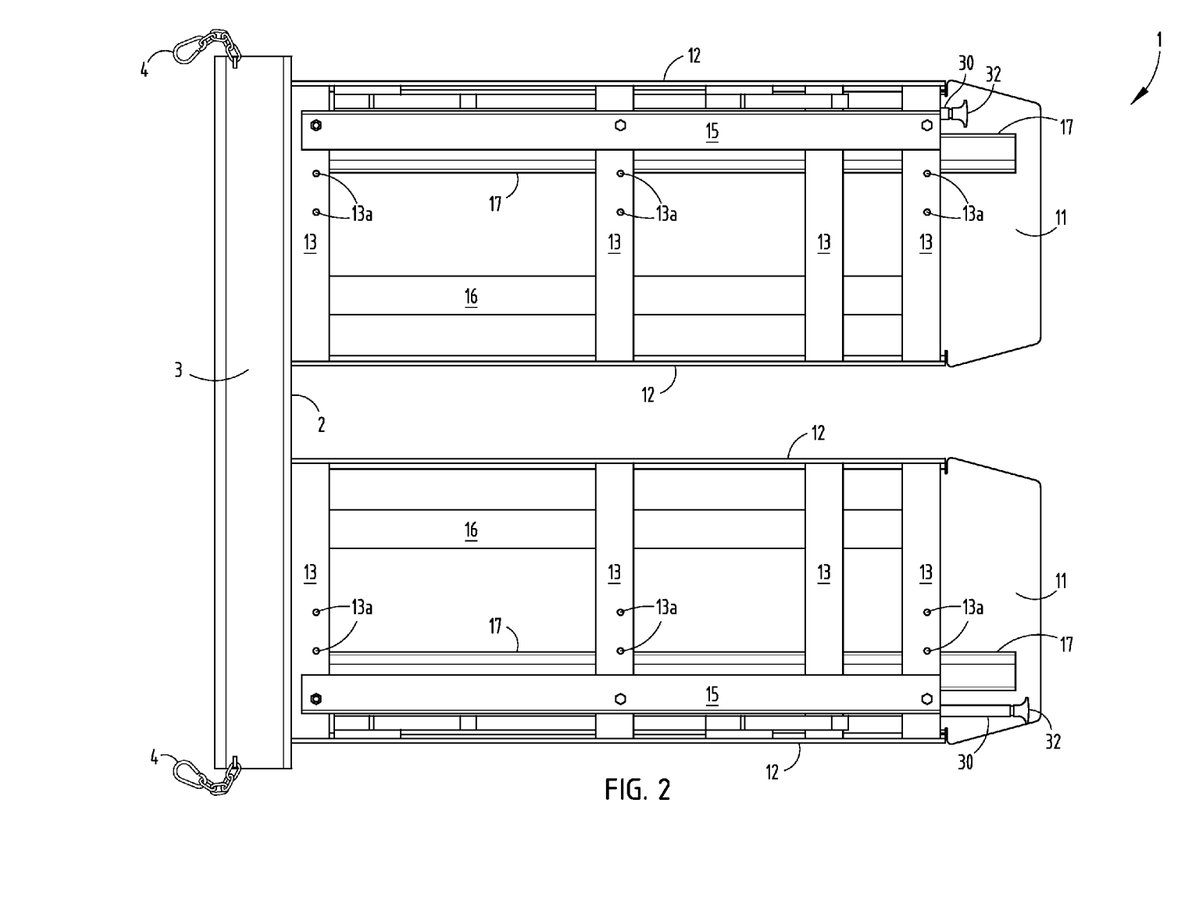
FIG. 2 is a bottom plan view of the adapter.

Elongated load support strips 14 are located on shoe top plate, near each of the opposed side edges thereof. A pallet being supported by shoe 10a or 10b will rest on load support strips 14. Each shoe 10a-b has a side wall 12 facing inwardly towards the inwardly facing side wall 12 of the other shoe, and an outwardly facing sidewall 12 which faces away from the adjacent shoe. Located at the bottom of each shoe 10a-b, and towards the outwardly facing sidewall 12 of each shoe 10a-b is a bottom guide rail 15, also referred to herein as a walkie tine guide rail 15. Each guide rail 15 is generally "L" shaped in cross section so that it has a downwardly extending leg. The tines of a walkie rider can slide between guide rails 15. Each guide rail 15 on each shoe 10a and 10b is bolted to the front, middle and back bottom braces 13. As shown in FIG. 2, guide rails 15 are spaced at their maximum distance apart. Alternative bolt holes 13a are provided on the front, middle and back bottom braces 13 so that guide rails 15 can be moved closer towards one another, thereby providing for a reasonably close fit at the outside edges of walkie rider tines, no matter what the combined width of the walkie rider tines is.

Located in the interior of each shoe 10a and 10b are spaced inner and outer interior guide rails 16 and 17 (FIGS. 1, 2), sometimes referred to herein as forklift tine guide rails 16 and 17. These guide rails are "L" shaped in cross section. Each outside rail 17 is the taller of the two, and is adjustably secured to the underside of shoe top wall 11. Guide rail 17 serves not only as a guide rail for the forklift tines which are inserted through openings 2a in the backstop wall 2, but also serves to protect the retractable leg assembly 20 from being hit by the forklift tines as they are inserted into the shoes 10a and 10b. The inner forklift tine guide rails 16 are mounted on mounting bars 16a, which in turn are secured to the underside of shoe top wall 11. Outer guide rail 17 can be adjusted to one of several different positions, in order to accommodate forklift tines of differing widths between outer interior guide rail 17 and inner interior guide rail 16.

Figure 7:
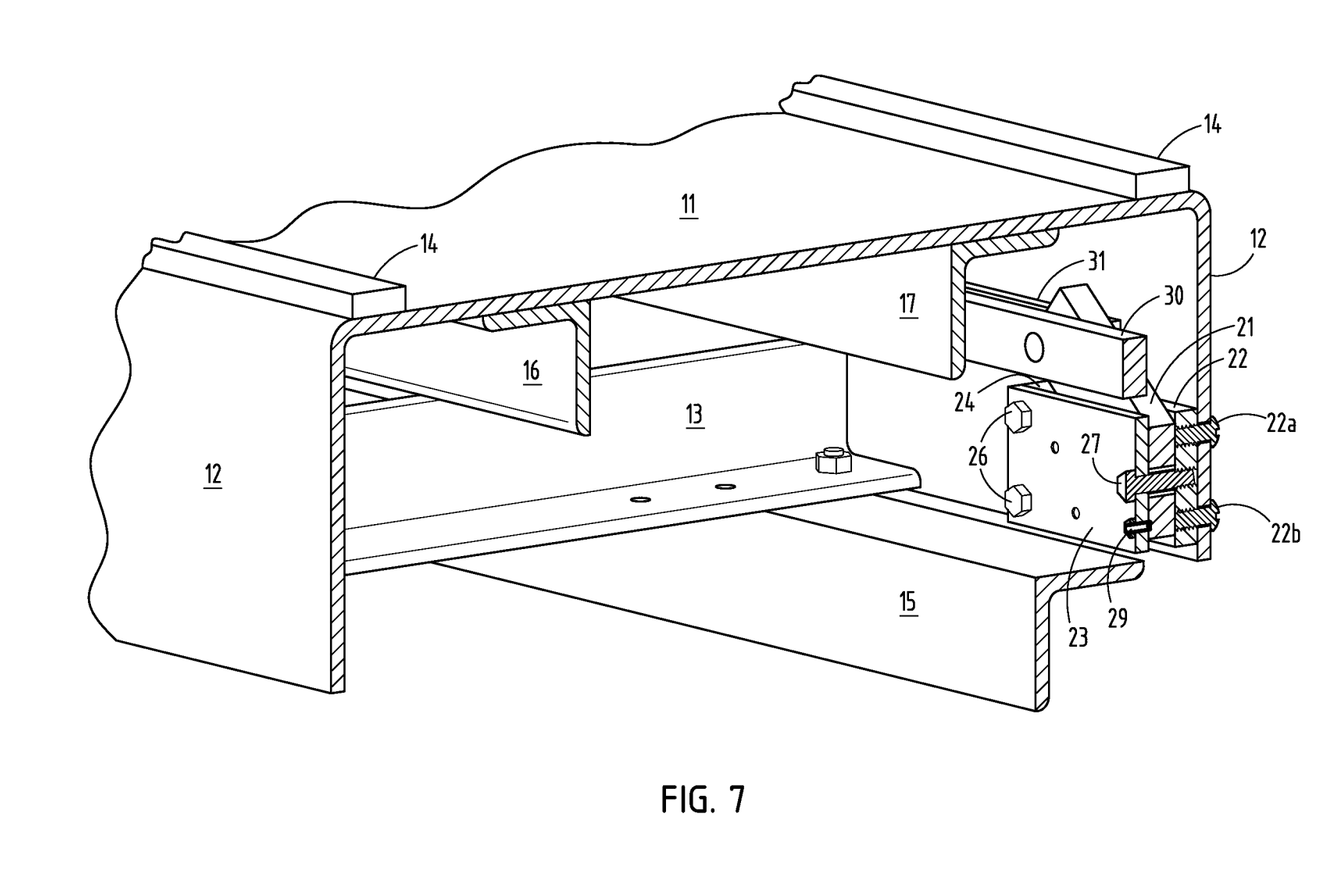
FIG. 7 is an enlarged cross sectioned perspective view of a portion of the adapter, showing the manner in which the detent pin helps hold the leg in its elevated position.
Figure 8:
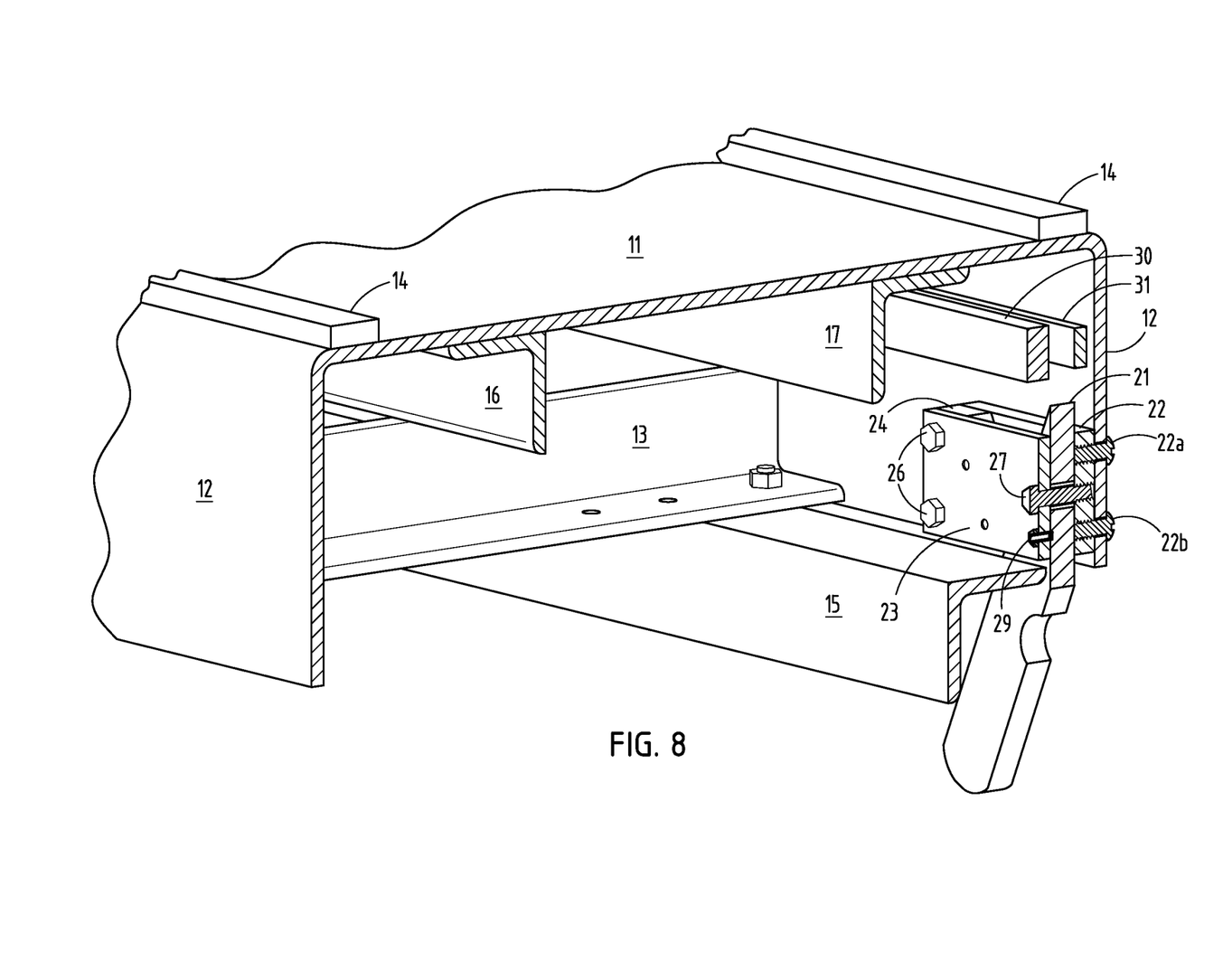
FIG. 8 is the same view as FIG. 7, showing the manner in which the detent pin helps hold the leg in its lowered position.

The retractable leg assembly 20 comprises legs 21 pivotably mounted between outer and inner mounting plates 22 and 23, respectively, and joined at their tops by an elongated actuator rod 30 (FIGS. 4-6). The outside mounting plate 22 is secured to the outwardly facing shoe wall 12 by fasteners 22a, 22b and 22c (FIGS. 1, 7 and 8). Each leg 21 and a leg stop block 24 are positioned between outer mounting plate 22 and inner mounting plate 23. Leg stop block 24 includes a raised leg stop surface 24a, and a lowered leg stop surface 24b. These surfaces limit the position of the legs 21 in their raised and lowered positions respectively.

Locator pins 25 pass through mating holes in inner mounting plate 23, leg stop block 24 and outer mounting plate 22 (FIG. 6). Rear mounting bolts 26 pass through apertures at the rear of inner mounting plate 23, the rear of leg stop block 24 and are threaded into receiving apertures in outer mounting plate 22. Forward mounting bolt and pivot axle 27 passes through a forward aperture in inner mounting plate 23, passes through a bushing 28 which itself is located in a pivot aperture 21a located about two-thirds up the length of leg 21. Bolt 27 then threads into a forwardly and centrally located threaded aperture in outer mounting plate 22.

An elongated control rod 30 and a stabilizer bar 31 are connected to the upper ends of each pair of front and rear legs 21. Control rod connector bolts 31a pass through apertures in stabilizer bar 31, and through bushings 31b which are positioned in leg aperture 21b near the upper ends of legs 21. Bolts 31a are then threaded into receiving apertures in control rod 30. A control rod actuator knob 32 is threaded onto a threaded member 33 which in turn threads into a nut 34 which is welded or otherwise secured to the end of control rod 30. Control knob 32 is located at or near the front opening in shoe 10a-b, so as to be readily manipulated. By pulling on control knob 32, one pulls on control rod 30, causing legs 21 to rotate downwardly until they hit leg stop surface 24b. Similarly, legs 21 can be raised (retracted) by pushing against knob 32 and rod 30 to rotate legs 21 upwardly until they engage leg stop surface 24a.

A detent member 29 is provided to engage at least one of the legs 21 to hold it in its retracted or extended position. Detent 29 is a threaded member having an internal spring loaded plunger. It is threaded into a nut 29a which is welded or otherwise secured to inner mounting plate 23 until the tip of detent 29 engages leg 21 with the desired force.

FIG. 7 is a partially cross sectioned view which shows the relative positions of the control rod 30 and leg 21 in the legs retracted position. FIG. 8 is the same cross sectional view, but showing the relationship between the components when leg 21 is in its lowered (extended) position.

In operation, pallet truck adapter 1 will be stored in some location, preferably with legs 21 extended. Legs 21 don't have to be extended if adapter 1 is going to be used with a forklift truck rather than a walkie rider. Indeed, leg assemblies 20 can be omitted entirely if the adapter is to be used solely with a fork lift truck. However with legs 21 in their extended, erect position, adapter 1 can be loaded onto the tines either of a forklift truck, which are inserted through openings 2A in backstop plate 2 and on into the interior of shoes 10A and 10B, between forklift tine rails 16 and 17; or alternatively, the tines of a walkie rider can be slid underneath adapter 1 with its legs 21 extended, and with the walkie rider tines positioned between the walkie tine guide rails 15. The position of guide rails 15 can be adjusted to accommodate wider or narrower walkie rider tines. Similarly, the adjustable outer forklift tine rails 17 can be adjusted to different positions to accommodate forklift tines of differing widths.

With the forklift or walkie rider tines in position, adapter 1 can be quickly secured to the truck or walkie rider using the quick disconnect clip 4. The tines are then raised to lift adapter 1 off of the floor, control knob 32 is pushed to cause legs 21 to retract into their upper position, and adapter 1 is now ready for use in conjunction with the walkie rider or forklift truck.

The truck or walkie rider is conveyed to the location of a "half pallet," and taller shoe 10*a* is inserted between the legs and beneath the bottom surface of the pallet. The pallet can then be raised slightly by raising the tines and the adapter 1, moved to another location and the shorter shoe 10*b* can then be inserted between the legs and below another half pallet. By raising the tines still further, the second pallet is also lifted off of the floor. The process can then be reversed to deposit the two pallets in the same or different destination positions.

Upon completion of use, the adapter can be stored by pulling on control knob 32 and control rod 30 to again extend the legs. The tines are lowered until the adapter 1 is resting on the floor, and the tines can then be removed by reversing the walkie rider or forklift truck.

Of course it is understood that the foregoing is a preferred embodiment of the invention and that various changes and alterations can be made without departing from the spirit and broader aspects of the invention.

The invention claimed is:

1. A method for moving pallets from a floor on a pallet truck, wherein said pallets are sufficiently small in width that two can be moved on a set of pallet truck tines, said method comprising:

provinding a pallet truck adapter having at least a pair of shoes for fitting over pallet supporting tines, the pallet truck adapter having a first shoe and a second shoe, the first shoe having a first sidewall, the second shoe having a second sidewall, the first sidewall of the first shoe being taller than the second sidewall of the second shoe along substantially an entire length of the first shoe and the second shoe;

said shoes having bottoms, tops and sides, said shoe bottoms being fixed and aligned in approximately the same plane;

manipulating said pallet truck to locate the first shoe beneath a first pallet resting on the floor, lifting the pallet adapter slightly off of a supporting surface by raising the pallet truck tines;

moving said first pallet, and locating the second shoe of said adapter beneath a second pallet resting on the floor, and raising said adapter further to also lift said second pallet off the floor; and moving both said first and second pallets about, and depositing them in a same location, or in separate locations, by lowering said adapter such that said second pallet makes first contact with the floor, and then said first pallet makes contact with the supporting surface.

* * * * *